United States Patent [19]

Harada et al.

[11] Patent Number: 5,456,871
[45] Date of Patent: Oct. 10, 1995

[54] APPARATUS FOR AND METHOD OF CONTROLLING CALENDER ROLL GAP

[75] Inventors: Eiichi Harada, Yokohama; Masaaki Urakawa; Teruyuki Urushibara, both of Yokosuka; Katsu Tsukii, Yokohama, all of Japan

[73] Assignee: Ishikawajima-Harima Heavy Industries Co., Tokyo, Japan

[21] Appl. No.: 26,921

[22] Filed: Mar. 5, 1993

[30] Foreign Application Priority Data

Mar. 10, 1992 [JP] Japan ................... 4-051687

[51] Int. Cl.⁶ .................. B29C 43/24; B29C 43/28; B29C 43/58
[52] U.S. Cl. .................. 264/40.1; 264/40.5; 264/175; 264/473; 425/141; 425/367
[58] Field of Search ............... 425/141, 145, 425/149, 367; 264/40.1, 40.5, 175; 364/473

[56] References Cited

U.S. PATENT DOCUMENTS

| | | | |
|---|---|---|---|
| 3,930,922 | 1/1976 | Donoghue et al. | 425/141 |
| 4,214,857 | 7/1980 | Woeckener et al. | 425/141 |

FOREIGN PATENT DOCUMENTS

| | | | |
|---|---|---|---|
| 1255224 | 1/1961 | France. | |
| 2543738 | 4/1977 | Germany. | |
| 62-151311 | 7/1987 | Japan | 425/141 |
| 3-292114 | 12/1991 | Japan | 425/141 |

OTHER PUBLICATIONS

Database WPIL, Week 9206, Derwent Publications Ltd., London, GB; AN 92-046168 & JP-A-3 292 114 (Ishikawajima-Harima Juko) 24 Dec. 1991.

*Primary Examiner*—Mathieu D. Vargot
*Attorney, Agent, or Firm*—Thomas K. Ziegler

[57] ABSTRACT

The roll gap control system for a calender having first and second rolls (18, 19) rolling a raw material (B) includes a load measuring unit (11) for detecting a rolling load change between the first and second rolls (18, 19), a roll shaft position adjusting device (41) for increasing/decreasing a roll gap and a controller (46) for computing a roll gap change ($\Delta h$) based on the rolling load change ($\Delta P$) and for activating the roll shaft position adjusting device (41) to compensate for the roll gap change ($\Delta h$). A spring constant (k) of first and second rolls (18, 19) and mechanical members (24, 25, 28) supporting these rolls of the calender is calculated, and the rolling load change ($\Delta P$) is divided by the spring constant (k). The quotient ($\Delta P/k$) is the roll gap change ($\Delta h$).

21 Claims, 3 Drawing Sheets

APPARATUS FOR AND METHOD OF CONTROLLING CALENDER ROLL GAP

BACKGROUND OF THE INVENTION

1. Technical Field

The present invention relates to an apparatus for and a method of controlling a gap between calender rolls.

2. Background Art

A calender which rolls a raw material such as resin and rubber between calender rolls should be controlled on a bank formed by the raw material between a roll gap. One of methods for controlling the bank is disclosed in Japanese Patent Application, published Nov. 5, 1977 with Publication No. 52-132072, entitled "Method of Adjusting Amount of Bank in Shaping by Calender". FIG. 3 of the accompanying drawings schematically illustrates the teaching of this disclosure.

As seen from FIG. 3, a bank 4 formed by a raw material 8 fed to a gap 3 between two calender rolls 1 and 2 is irradiated by a light 5 and scanned by a camera 6 to calculate a volume of bank 4. This calculation is used to control the supply of the raw material 8 which is carried by a conveyor 7. It is known that the thickness of products changes if the supply of the raw material changes, and this method maintains the volume of bank 4 at a predetermined value to produce products having the same thickness.

However, this approach has the following drawback: Although the bank 4 is three dimensional, the camera 6 can only provide two dimensional information. As a result, the reliability of the information obtained through the camera 6 is limited or an accurate bank control is theoretically impossible. Such an incomplete control does not result in producing products having the same thickness.

In addition, the roll gap 3 of a calender of the type as shown in FIG. 8 changes not only with the volume and shape of bank 4, but also with the temperature and plasticity (or viscosity) of the material 8. The change of the roll gap 3 results in the change of the thickness of the product. Therefore, controlling the volume of the bank 4 is not sufficient.

There are other Japanese Patent Applications (Publication Nos. 56-62125, 56-80447 and 59-26220) which also disclose apparatuses for and methods of controlling the roll gap. In these applications, the volume of the bank is detected by a detector which includes an electrostatic capacitor, an optical detector or an image detector, to control the roll gap. However, like the aforementioned prior art, the temperature and the plasticity (viscosity) of the raw material and bank are not considered in controlling the roll gap. Therefore, even if the temperature and/or the plasticity of the raw material changes, the roll gap is not adjusted.

SUMMARY OF THE INVENTION

An object of the present invention is to provide apparatus for and method of controlling a roll gap of a calender which can eliminate the above mentioned problems.

According to one aspect of the present invention, there is provided a system for controlling a gap between rolls of a calender comprising first and second rolls for rolling a first raw material, first load measuring means for detecting a first rolling load change between the first and second rolls, first roll position adjusting means for adjusting a first roll gap between the first and second rolls, and a first controller for computing a first roll gap change based on the first rolling load change and for adjusting the first roll gap using the first roll position adjusting means to compensate for the first roll gap change. With this system, even if the amount, temperature and viscosity of the raw material changes and/or a volume of bank changes, which results in the change of rolling load between the first and second rolls, the roll gap is maintained at a predetermined value. Therefore, the calender rolls out sheet-like products having the same thickness. In this specification, the rolling load is a roll splitting or separating force, as shown in FIG. 4 of the accompanying drawings.

Two sets of first rolling load measuring means, first roll position adjusting means and first controller may be provided for each roll at ends of a roll shaft to maintain the first and second rolls in a parallel relation.

The system may further include a first position sensor for detecting a position of the first roll.

The system may further include third and fourth rolls for rolling a second raw material, second load measuring means for detecting a second rolling load change between the third and fourth rolls, second roll position adjusting means for adjusting a second roll gap between the third and fourth rolls, and a second controller for computing a second roll gap change based on the second rolling load change and for adjusting the second roll gap using the second roll position adjusting means to compensate for the second roll gap change. The first raw material rolled by the first and second rolls and the second raw material rolled by the third and fourth rolls may be fed to a third roll gap between the second and third rolls while feeding a fabric between the first and second raw materials, so as to double coat the fabric with the first and second raw materials.

The system may further include third rolling load measuring means for detecting a third rolling load change between the second and third rolls, third roll position adjusting means for adjusting a third roll gap between the second and third rolls, and a third controller for computing a third roll gap change based on the third rolling load change and for adjusting the third roll gap using the third roll position adjusting means to compensate for the third roll gap change.

Since the rolling load between the first and second rolls is influenced by the rolling load between the second and third rolls and that between the third and fourth rolls, the first, second and third controllers may be interconnected with each other such that the detection values of the first, second and third load measuring means are exchanged between the first, second and third controllers to be used in computing and adjusting the respective roll gap changes.

According to another aspect of the present invention, there is provided a method of controlling a gap between rolls of a calender comprising the steps of rolling a first raw material between first and second rolls, detecting a first rolling load change between the first and second rolls, computing a first roll gap change between the first and second rolls, based on the first rolling load change, and adjusting the gap between the first and second rolls to compensate for the first roll gap change. With this method, even if an amount, temperature and viscosity of the raw material change and/or an amount of bank changes, which results in the change of rolling load between the first and second rolls, the roll gap is adjusted to a predetermined value. Therefore, the calender rolls out sheet-like products having the same thickness.

The first roll gap change computing step may include obtaining a first spring constant of first and second rolls and supporting members for these rolls of the calender, dividing the rolling load change by the first spring constant, and changing the first roll gap by the quotient.

DETAILED DESCRIPTION OF PREFERRED EMBODIMENTS

Figure 1:
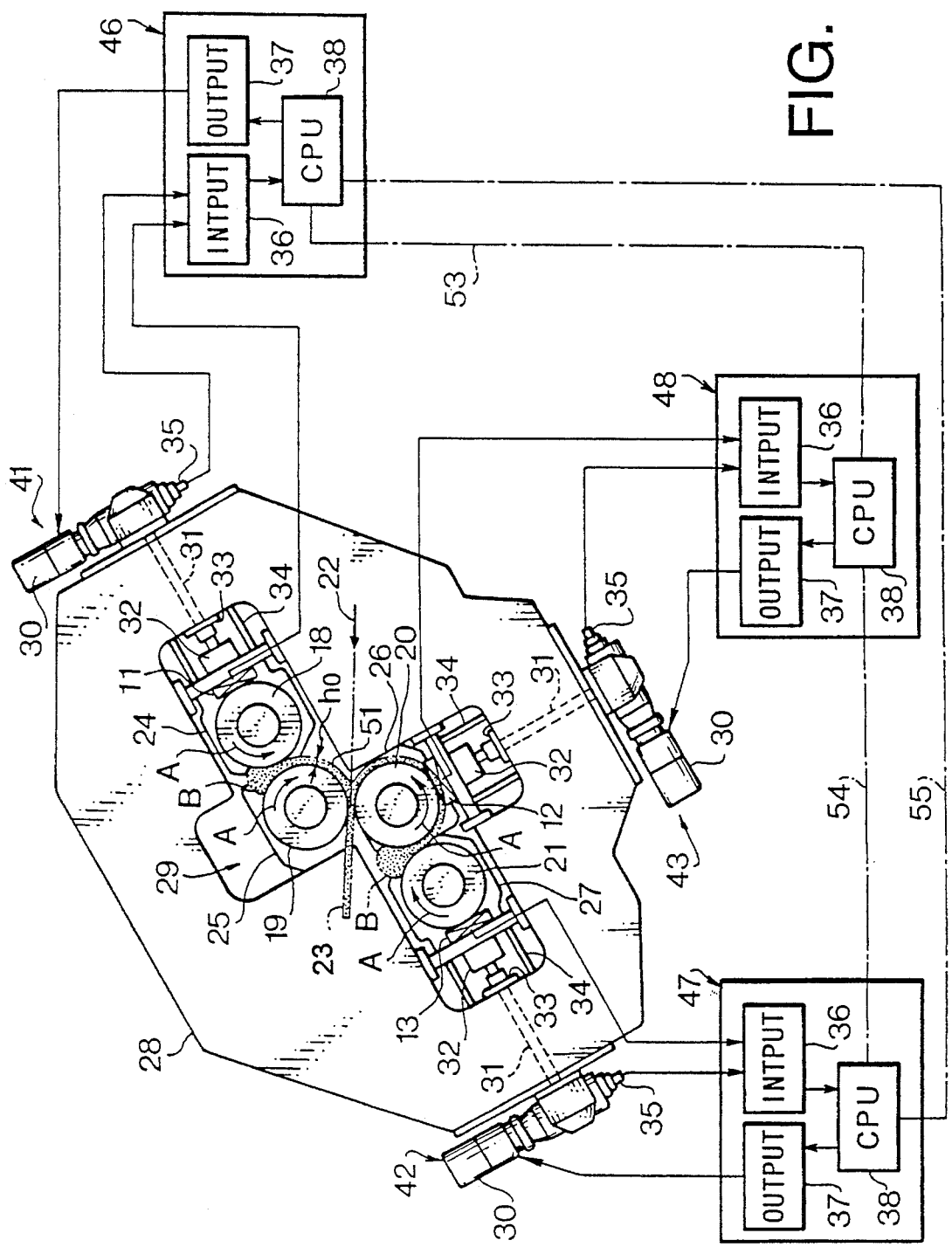
FIG. 1 shows a lateral view of a calender roll gap controlling apparatus according to the present invention.

Referring to FIG. 1, an embodiment of a system for controlling a calender roll gap according to the present invention will be explained. This system includes load measuring units 11, 12 and 13, roll shaft position adjusting means 41, 42 and 43 and controllers 46, 47 and 48. The load measuring unit 11 (or 12 or 13) is provided to detect the rolling load and its change between each pair of calender rolls (18–19, 19–20 and 20–21). The roll shaft position adjusting means 41, 42 and 43 are provided to increase/decrease the clearance between the rolls (18–19, 19–20 and 20–21). The controllers 46, 47 and 48 perform predetermined calculations with values detected by the load measuring units 11–13 and output activation signals to the shaft position adjusting means 41, 42 and 43, respectively. It should be noted that although each roll is provided with two load measuring units, two shaft position adjusting means and two controllers near longitudinal ends of the roll, FIG. 1 only shows one end of the roll with one load measuring unit, one shaft position adjusting means and one controller.

The calender of this embodiment includes four calender rolls 18, 19, 20 and 21. These four rolls are arranged like an "S" (or an inclined "Z") in the illustration. Each roll extends in a direction perpendicular to the drawing sheet. A raw material (B) is fed toward the gap between the first and second rolls 18 and 19 and the gap between the third and fourth rolls 20 and 21, respectively. Each roll rotates in a direction as indicated by the arrow A so that the raw material is rolled by a pair of rolls (18–19 and 20–21) and a sheet 51 having a thickness ho is rolled out. Two sheets 51 are then introduced to a gap between the second and third rolls 19 and 20. Simultaneously, a fabric (steel) 22 is fed between the two sheets 51. Accordingly, the two sheets 51 and the steel 22 are squeezed by the second and third rolls 19 and 20 such that the steel 22 is coated with the sheets 51 on both sides. As a result, a double-coated product (e.g., sheet-shaped rubber) 23 is rolled out from the second and third rolls 19 and 20. The product 23 may be used as a tire or belt.

The calender rolls 18, 19, 20 and 21 are supported in a frame 28 by means of respective axle boxes 24, 25, 26 and 27. Although two axle boxes are provided at ends of each roll shaft, respectively, FIG. 1 shows only end of the roll shaft.

The frame 28 has a relatively large opening 29 so that the axle boxes 24–27 can move in respective radial directions.

The load measuring units 11, 12 and 13 are mounted on the axle boxes 24, 26 and 27 of the first, third and fourth rolls 18, 20 and 21, respectively to measure the rolling loads and their change between the first and second rolls 18 and 19, the second and third rolls 19 and 20 and the third and fourth rolls 20 and 21, respectively.

The shaft position adjusting means 41, 42 and 43 are provided for the first, fourth and third rolls 18, 21 and 20, respectively. Each shaft position adjusting means includes a rotary motor 30, a screw rod 31 and a connection member 32. Each motor 30 is mounted on an outer surface of the frame 28. Each screw rod 31 perpendicularly extends from the motor 30 toward the center of the roll. Provided near and at the extending end of the rod 31 are a nut 33 and the connection member 32. The nut 33 is supported by the frame 28. The connection member 32 joins the rod 31 of the position adjusting means 41 (or 42 or 43) with the axle box 24 (or 27 or 26). Therefore, the axle box 24 (or 26 or 27) reciprocates along a guide 34 as the screw rod 31 rotates. The screw rod 31 is rotated by the motor 30. An output shaft of the motor 30 is provided with a rotation sensor 35 for detecting the position of the axle box 24 (26 or 27) by counting the number of rotations of the motor 30.

Controllers 46, 47 and 48 are provided for the shaft position adjusting means 41, 42 and 43, respectively. Two controllers are provided for each roll, but FIG. 1 shows one controller for each roll. Each controller 46 (47 or 48) has an input 36 connected with the load measuring unit 11 (13 or 12) and the rotation sensor 35, an output 37 connected with the motor 30 and a central processing unit (CPU) 38 connected with the input 36 and the output 37. The CPU 38 includes arithmetic expressions to compute a deformation of the frame 28 and so on, based on values sent to the input 36. The load measuring unit 11 (12 or 13) and the rotation sensor 35 supply their detection values. After the computation, the CPU 38 outputs a signal to the motor 30 via the output 36 to activate the motor 30. The rolling loads between the first and second rolls 18 and 19, the second and third rolls 19 and 20 and the third and fourth rolls 20 and 21 influence the roll gaps between these three pair of rolls respectively so that the controllers 46, 47 and 48 are interconnected with each other as indicated by the broken lines 53, 54 and 55, so as to enable the information exchange therebetween.

Next, the operation of the CPU 38 will be explained. Since the CPUs 38 of the controllers 46, 47 and 48 are substantially the same, only the operation of the CPU of the controller 46 will be explained. Accordingly, the following description mainly deals with the rolls 18 and 19 and the other rolls will be explained only as required.

The thickness of the sheet 51 formed by the rolls 18 and 19 or a substantial roll gap no changes in the sheet length direction (the tangential direction of the roll) and the sheet width direction (the direction perpendicular to the drawing sheet or the roll length direction) when the rolling load of the rolls 18 and 19 changes. This is because the rolls 18 and 19 deflect and the roll supporting structure (axle-boxes 24 and 25 and frame 28) deflect as the rolling proceeds. Generally, the sheet thickness ho can be expressed by a following equation (1):

$$ho = So + Po/k \tag{1}$$

Figure 4:
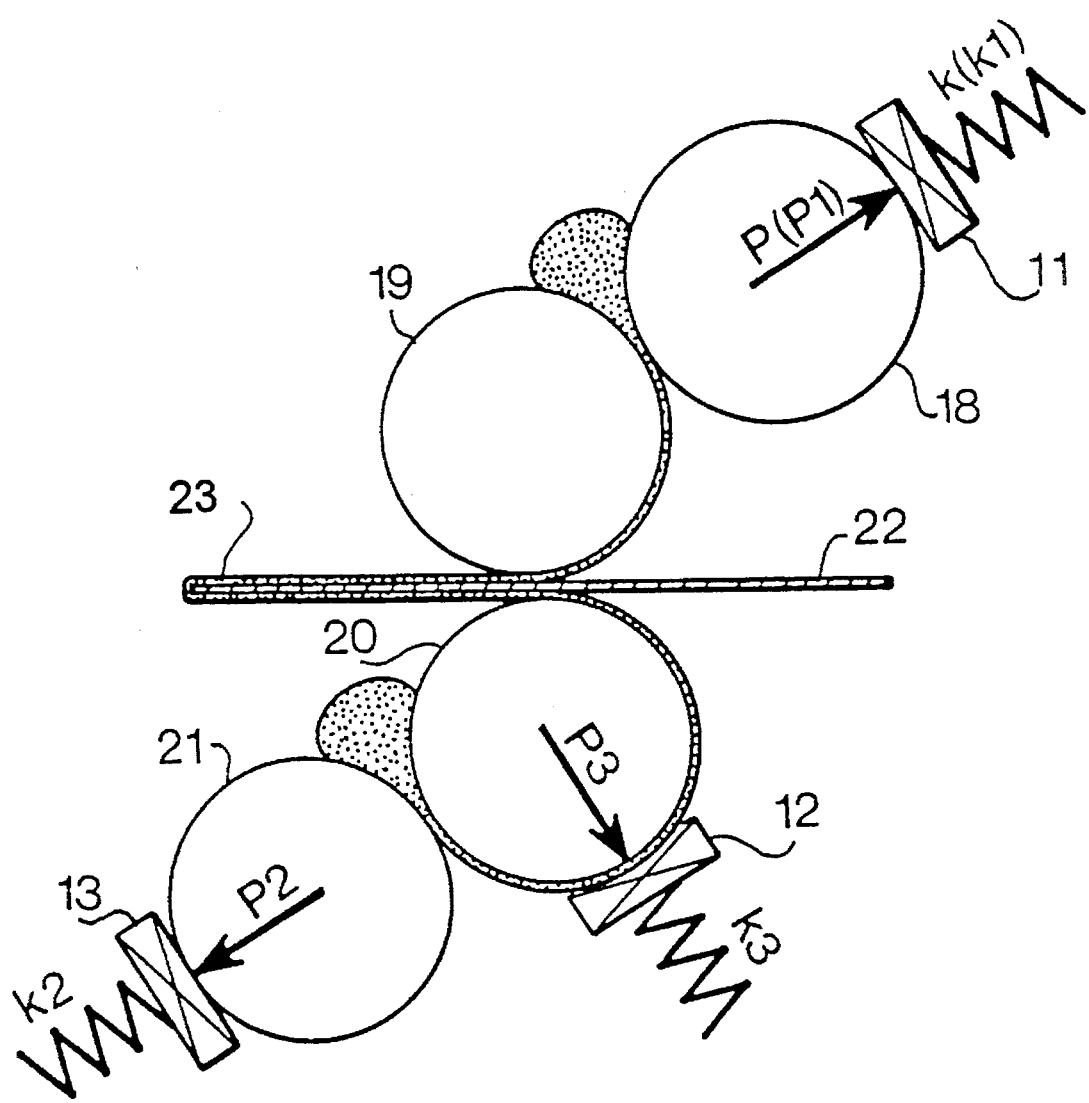
FIG. 4 illustrates the relation between rolling load P and spring constant k according to the present invention.

Here, So represents an initial roll gap between the rolls 18 and 19, Po represents a preset rolling load of the rolls 18 and 19 and k represents the spring constant of the roll supporting structure 24, 25 and 28 and the rolls 18 and 19 in the direction connecting with the centers of the rolls 18 and 19 (FIG. 4). The spring constant k is determined by the structure and installation of the frame 28, those of axle boxes 24 and 25, those of rolls 18 and 19 and other various factors. In an actual case, the spring constant k is actually measured using a real calender or computed using a simulation technique. The spring constant k is stored in the CPU 38 prior to the rolling operation. It should be noted that generally the spring constant k (k1) of the rolls 18 and 19 is different from that k2 of the rolls 19 and 20 and that k3 of the rolls 20 and 21. Further, generally So (So1), ho (ho1) and Po (Po1) of the rolls 18 and 19 are different from those (So2, ho2, Po2) of the rolls 19 and 20 and those (So3, ho3, Po3) of the rolls 20 and 21.

When the situations or conditions of the raw material and bank B such as physical shape, temperature and plasticity (viscosity) change, a small rolling load change occurs ($\Delta P$). As a result, the thickness of the sheet 51 changes ($\Delta h$). This can be expressed by a following equation (2):

$$\Delta h = \Delta P / k \qquad (2)$$

Here, it should be noted that generally the small thickness change (or roll gap change) $\Delta h$ ($\Delta h1$) between the rolls 18 and 19 is different from that $\Delta h2$ between the rolls 19 and 20 and that $\Delta h3$ between the rolls 20 and 21. Further, the small rolling load change $\Delta P$ ($\Delta P1$) of the rolls 18 and 19 is different from that $\Delta P2$ of the rolls 19 and 20 and that $\Delta P3$ of the rolls 20 and 21.

The spring constant k (k1) of the rolls 18 and 19 is affected by the spring constant k2 of the rolls 19 and 20 and that k3 of the rolls 20 and 21. Thus, the equation (2) will be written to a following equation (2):

$$\Delta h1 \Delta P1/k1_{(18-19)} + \Delta P2/k1_{(19-20)} + \Delta P3/k1_{(20-21)} \qquad (2')$$

Here, $\Delta P2/k1_{(19-20)}$ represents the roll gap change between the rolls 18 and 19 caused by the roll gap change between the rolls 19 and 20 and $\Delta P3/k1_{(20-21)}$ represents the roll gap change between the rolls 18 and 19 caused by the roll gap change between the rolls 20 and 21. The information about the second and third terms of the equation (2') is obtained from the controllers 47 and 48 through the lines 53 and 55. In an actual case, however, the second and third terms of the equation (2') are negligibly small. Thus, the equation (2') will be $\Delta h1 = \Delta P1/k1_{(18-19)}$, which is identical with the equation (2).

From the equations (1) and (2), therefore, the thickness of the sheet 51 can be expressed by the equation (3):

$$h = ho + \Delta h = So + (Po + \Delta P)/k \qquad (3)$$

The rolling load change $\Delta P$ is detected by the load detector 11. The rolling load change $\Delta P$ is divided by the spring constant k to obtain the thickness change (roll gap change) $\Delta h$. This thickness change $\Delta h$ is fedback to the shaft position adjusting means 41 to adjust the roll gap thereby compensating for the roll gap change $\Delta h$ and maintaining the roll gap constant.

If disturbances of mechanical members of the calender (e.g., decentering of the rolls 18 and 19), state and size of the raw material and/or other factors should be considered, a certain control constant C is selected in view of them to modify the equation (3). In such a case, the equation (3) will be:

$$\Delta H = \Delta h * C \qquad (4)$$

Here, * represents to multiply or to use a certain function.

Figure 2:
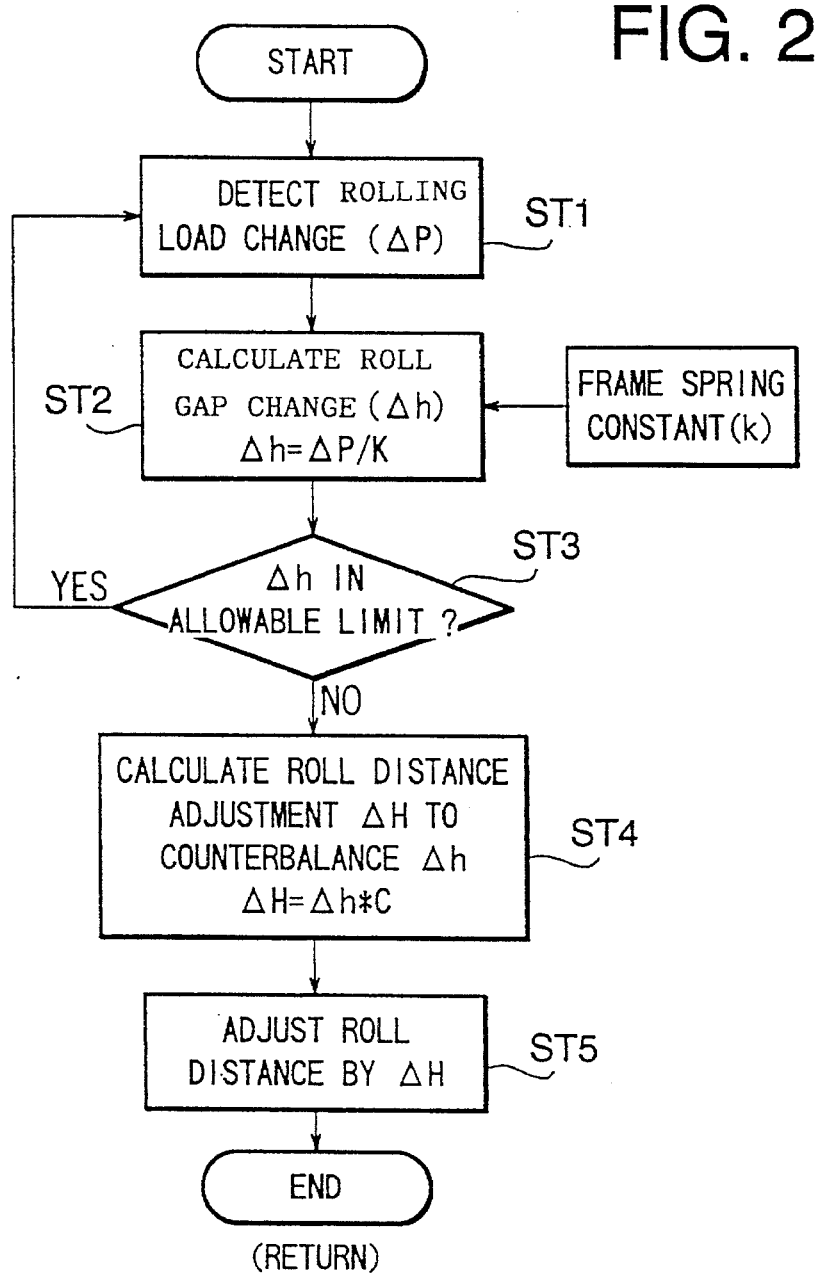
FIG. 2 is a flowchart showing a calender roll gap control according to the present invention.
Figure 3:
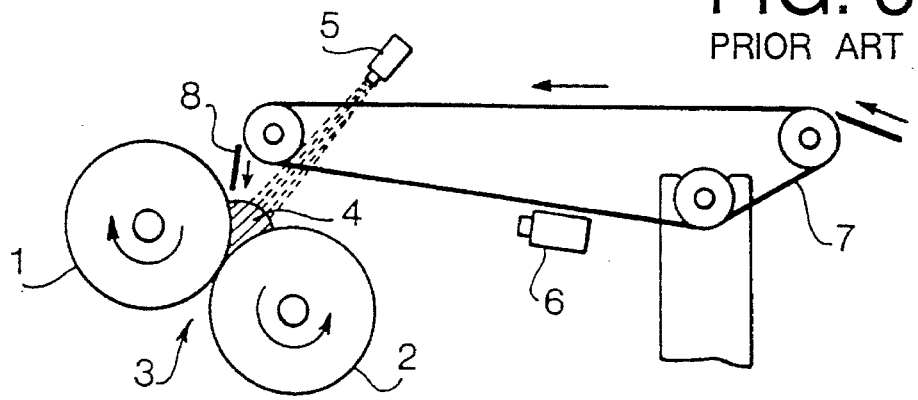
FIG. 3 schematically illustrates a lateral view of a calender roll gap controlling apparatus according to the prior art.

Now, the control of the roll gap will be explained with reference to the flowchart of FIG. 2.

If the amount of bank B changes due to the change of supply rate of the raw material (rubber, for example), the rolling load P between the rolls 18 and 19 changes from the initial value Po. This load change $\Delta P$ is detected by the detector 11 (ST1). $\Delta P$ may be obtained by simply calculating the difference between the current load P and the initial load Po.

Then, the roll gap change $\Delta h$ of is computed by dividing the rolling load change $\Delta P$ by the spring constant k (ST2, equation (2)). If the roll gap change $\Delta h$ is very small or substantially zero (P=Po) and no influence appears on the sheet thickness, the program returns to step 1 (ST3).

If the roll gap change $\Delta h$ is larger than an allowable limit, the roll distance adjustment $\Delta H$ is computed using the equation (4) (ST4) and the controller activates the motor 30 to move the axle box 24 and in turn the roll 18 by $\Delta H$. As mentioned earlier, the position of the axle box 24 is detected by the rotation sensor (axle box position sensor) 35. It should be noted that if equation (4) is not necessary in controlling the roll gap, step 4 is skipped and the program proceeds to step 5 from step 3.

When the motor 30 is activated and the screw rod 31 rotates, the axle box 24 moves diagonally upward or downward in FIG. 1 to adjust the position of the roll 18 (ST5). Accordingly, the roll gap change $\Delta H$ (or $\Delta h$) is compensated for and the roll gap is maintained constant (ho).

According to the present invention, as understood from the above description, the cause of the roll gap change is detected in the form of rolling load change, not bank amount change, the roll gap is controlled under consideration of all the factors affecting the thickness of the product. In other words, an appropriate control which can cope with the change of raw material temperature and plasticity is realized.

The roll gap adjustment between the rolls 20 and 21 and the rolls 19 and 20 is performed in a similar manner as explained above.

FIG. 1 shows one end of the rolls and the above explanation deals with one side of the calender. However, the axle boxes, load measuring units and roll shaft position adjusting means are provided for both ends of each roll and each axle box is controlled individually, so as to maintain the rolls 18 and 19, the rolls 19 and 20 and the rolls 20 and 21 in parallel relation, respectively. Therefore, the sheet thickness in the sheet width direction (direction perpendicular to drawing sheet) is also maintained constant.

In the illustrated embodiment, the roll shaft position is adjusted by the combination of motor 30 and screw 31. However, a hydraulic cylinder and a hydraulic pressure valve may be used instead. Further, the item 41 is called the roll shaft position adjusting means in the foregoing. However, it may be called roll position adjusting means since the roll shaft and the roll are integral and the item 41 is provided for changing the roll position.

In addition, although the calender of the embodiment has four rolls 18–21, the calender may have three or five rolls, and the rolls may be arranged in the shape of an "L", up-side-down "L" or "Z".

The teaching of the present invention can be applied to a conventional calender if it is provided with a roll shaft position adjusting mechanism. Therefore, the present invention is expecially practical.

We claim:

1. For use with a calender having first, second, third and fourth rolls, the first and second rolls being movably installed next to each other with a first gap therebetween, the third and fourth rolls being movably installed next to each other with a second gap therebetween, the second and third rolls being movably installed next to each other with a third gap therebetween, a first raw material being fed into the first gap and rolled therebetween with a first rolling load, a second raw material being fed between the second gap and rolled therebetween with a second rolling load, the first and second raw material being fed into the third gap and rolled and joined therebetween with a third rolling load, a method comprising the steps of:

(A) detecting a first rolling load change between the first and second rolls;

(B) detecting a second rolling load change between the third and fourth rolls;

(C) detecting a third rolling load change between the second and third rolls; and (D) adjusting the first gap, based on the first, second and third rolling load changes.

2. The method of claim 1, wherein step (D) includes the step of determining an amount of adjustment ($\Delta h1$) which is obtained by the following equation:

$$\Delta h1 = \Delta 1' + \Delta h1'' + \Delta h1'''$$

where $\Delta h1'$ is a gap change in the first gap caused by the first rolling load change, $\Delta h1''$ is a gap change in the first gap caused by the second rolling load change, $\Delta h1'''$ is a gap change in the first gap change by the third rolling load change.

3. The method of claim 2, further including the steps of:

determining a first spring constant in the direction of the first gap, based on the rigidity of the first and second rolls and supporting members for these rolls;

determining a second spring constant in the direction of the second gap, based on the rigidity of the third and fourth rolls and supporting members for these rolls;

determining a third spring constant in the direction of the third gap, based on the rigidity of the second and third rolls and supporting members for these rolls; and wherein $\Delta h1'$ is obtained by dividing the first rolling load change by the first spring constant, $\Delta h1''$ is obtained by dividing the second rolling load change by the second spring constant and $\Delta h1'''$ is obtained by dividing the third rolling load change by the third spring constant.

4. The method of claim 3, further including the step of maintaining the first and second rolls in parallel relating to each other.

5. The method of claim 4, further including the step of feeding a fabric between the first and second raw materials, so as to double coat the fabric with the first and second raw materials.

6. The method of claim 5, further including the step (E) of maintaining the second gap based on the first, second and third rolling load changes.

7. The method of claim 6, wherein the step (E) includes the step of determining an amount of adjustment ($\Delta h2$) which is obtained by the following equation:

$$\Delta h2 = \Delta h2' + \Delta h2'' + \Delta h2'''$$

where $\Delta h2'$ is a gap change in the second gap caused by the first rolling load change, $\Delta h2''$ is a gap change in the second gap caused by the second rolling load change and $\Delta h2'''$ is a gap change in the second gap caused by the third rolling load change.

8. The method of claim 7, further including the steps of:

determining a fourth spring constant in the direction of the first gap, based on the rigidity of the first and second rolls and supporting members for these rolls;

determining a fifth spring constant in the direction of the second gap, based on the rigidity of the third and fourth rolls and supporting members for these rolls;

determining a sixth spring constant in the direction of the third gap, based on the rigidity of the second and third rolls and supporting members for these rolls; and wherein $\Delta h2'$ is obtained by dividing the first rolling load change by the fourth spring constant, $\Delta h2''$ is obtained by dividing the second rolling load change by the fifth spring constant and $\Delta h2'''$ is obtained by dividing the third rolling load change by the sixth spring constant.

9. The method of claim 8, further including the step of maintaining the third and fourth rolls in parallel relation to each other.

10. For use with a calendar having a first, second, third and fourth rolls, the first and second rolls being movably installed next to each other with a first gap therebetween, the third and fourth rolls being movably installed next to each other with a second gap therebetween, the second and third rolls being movably installed next to each other with a third gap therebetween, a first raw material being fed into the first gap and rolled therebetween with a first rolling load, a second raw material being fed into the second gap and rolled therebetween with a second rolling load, the first and second raw materials being fed into the third gap and rolled and joined with a third rolling load, an apparatus comprising:

first load measuring means for detecting a first rolling load change between the first and second rolls;

second load measuring means for detecting a second rolling load change between the third and fourth rolls;

third load measuring means for detecting a third rolling load change between the second and third rolls; and means for adjusting the first gap, based on the first, second and third rolling load changes.

11. The apparatus of claim 10, wherein the first gap adjusting means includes a first module for adjusting position of the first roll.

12. The system of claim 11, wherein the first module includes a first shaft for moving the first roll and a first cylinder device for activating the first shaft.

13. The apparatus of claim 12, wherein the first gap adjusting means includes means for determining an amount of adjustment ($\Delta h1$) which is obtained by the following equation:

$$\Delta h1 = \Delta h1' + \Delta h1'' + \Delta h1'''$$

where $\Delta h1'$ is a gap change in the second gap caused by the first rolling load change, $\Delta h1''$ is a gap change in the second gap caused by the second rolling load change and $\Delta h1'''$ is a gap change in the second gap caused by the third rolling load change.

14. The apparatus of claim 13, further including means for determining a first spring constant in the direction of the first gap, a second spring constant in the direction of the second gap and a third spring constant in the direction of the third gap, based on rigidity of the first, second, third and fourth rolls as well as supporting members for these rolls, and wherein $\Delta h1'$ is obtained by dividing the first rolling load change by the first spring constant, $\Delta h1''$ is obtained by dividing the second rolling load change by the second spring constant and $\Delta h1'''$ is obtained by dividing the third rolling load change by the third spring constant.

15. The apparatus of claim 14, further including means for adjusting the first and second rolls in parallel relation to each other.

16. The method of claim 15, further including means for adjusting the second gap on the first, second and third rolling load changes.

17. The method of claim 16, wherein the second gap adjusting means includes a second module for adjusting the position of the fourth roll.

18. The system of claim 17, wherein the second module includes a second shaft for moving the first roll and a second cylinder device for activating the second shaft.

19. The apparatus of claim 18, wherein the second gap adjusting means includes a means for determining an amount of adjustment ($\Delta h2$) which is obtained by the following equation:

$$\Delta h2 = \Delta h2' + \Delta h2'' + \Delta h2'''$$

where $\Delta h2'$ is a gap change in the second gap caused by the first rolling load change, $\Delta h2''$ is a gap change in the second gap caused by the second rolling load change and $\Delta h2'''$ is a gap change in the second gap caused by the third rolling load change.

20. The apparatus of claim 19, further including means for determining a fourth spring constant in the direction of the first gap, a fifth spring constant in the direction of the second gap and a sixth spring constant in the direction of the third gap, based on the rigidity of the first, second, third and fourth rolls as well as supporting members for these rolls, and wherein $\Delta h2'$ is obtained by dividing the first rolling load change by the fourth spring constant, $\Delta h2''$ is obtained by dividing the second rolling load change by the fifth spring constant and $\Delta h2'''$ is obtained by dividing the third rolling load change by the sixth spring constant.

21. The apparatus of claim 20, further including means for maintaining the third and fourth rolls in parallel relation to each other.

* * * * *